United States Patent
Sasse et al.

(10) Patent No.: US 11,548,646 B2
(45) Date of Patent: Jan. 10, 2023

(54) HYBRID SUPPORT RAIL FOR RECEIVING FIXTURES IN A CABIN OF A VEHICLE

(71) Applicant: Airbus Operations GmbH, Hamburg (DE)

(72) Inventors: Bernd Sasse, Hamburg (DE); Memis Tiryaki, Hamburg (DE); Ottmar Schramm, Hamburg (DE)

(73) Assignee: Airbus Operations GmbH

( * ) Notice: Subject to any disclaimer, the term of this patent is extended or adjusted under 35 U.S.C. 154(b) by 248 days.

(21) Appl. No.: 16/901,283

(22) Filed: Jun. 15, 2020

(65) Prior Publication Data

US 2020/0398990 A1 Dec. 24, 2020

(30) Foreign Application Priority Data

Jun. 24, 2019 (DE) ...................... 10 2019 116 891.0

(51) Int. Cl.
*B64D 11/06* (2006.01)
*B64C 1/20* (2006.01)
(52) U.S. Cl.
CPC ............ *B64D 11/0696* (2013.01); *B64C 1/20* (2013.01)
(58) Field of Classification Search
CPC ............................. B64C 1/20; B64C 11/0696
See application file for complete search history.

(56) References Cited

U.S. PATENT DOCUMENTS

2005/0133666 A1* 6/2005 Zerner ............... B64D 11/0696
244/118.6
2017/0334564 A1* 11/2017 Born ........................ B64G 1/60
(Continued)

FOREIGN PATENT DOCUMENTS

| CN | 107672813 A | 2/2018 |
|---|---|---|
| DE | 10252886 A1 | 6/2004 |
| DE | 202004007781 U1 | 8/2004 |
| DE | 102015100189 A1 | 7/2016 |
| DE | 102017119581 A1 | 1/2019 |

(Continued)

OTHER PUBLICATIONS

German Search Report for Application No. 10 2019 116 891.0 dated Feb. 12, 2022, pp. 1-6 (p. 2 categorizing the cited references).
Extended European Search Report for Application No. 20172391.3, dated Oct. 22, 2020, 8 pages.

*Primary Examiner* — Assres H Woldemaryam
*Assistant Examiner* — Shanna Danielle Glover
(74) *Attorney, Agent, or Firm* — Lerner, David, Littenberg, Krumholz & Mentlik, LLP

(57) ABSTRACT

A hybrid support rail for receiving fixtures in a cabin of a vehicle includes a support rail base, first attachment elements, second attachment elements formed so as to be complementary to the first attachment elements, and a support rail upper part. The support rail base has a lower side and an upper side. The upper side has a receiving housing extending along a main extension direction of the support rail base for sliding in first attachment elements and, on a side facing away from the lower side, a support surface having at least one recess. The receiving housing is formed so as to prevent the first attachment elements from sliding out towards the support surface. The support rail upper part has a contact surface for placement on the support surface. The contact surface has recesses through which the second attachment elements are guided for insertion in the first attachment elements.

14 Claims, 3 Drawing Sheets

(56) References Cited

U.S. PATENT DOCUMENTS

2018/0029714 A1 2/2018 Lucas et al.
2019/0134762 A1 5/2019 Mialhe et al.

FOREIGN PATENT DOCUMENTS

| EP | 3483058 A1 | 5/2019 | |
| FR | 3089949 A1 * | 6/2020 | ......... B64D 11/0696 |
| WO | 2017064288 A1 | 4/2017 | |

* cited by examiner

HYBRID SUPPORT RAIL FOR RECEIVING FIXTURES IN A CABIN OF A VEHICLE

FIELD OF THE INVENTION

The invention relates to a hybrid support rail for receiving fixtures in a cabin of a vehicle and to an aircraft comprising a cabin and a support rail arranged therein.

BACKGROUND OF THE INVENTION

For structural components which are arranged in interiors of commercial aircraft and other means of transport, different requirements apply depending on the application. To attach fixtures in a cabin, support rails extending approximately in the longitudinal direction of the cabin are used, which rails are part of a floor support or can be attached thereto. Since, in a commercial aircraft, considerable loads can be assumed when dimensioning support elements of this type, said support elements are conventionally provided with correspondingly high strength.

Furthermore, structural components of this type are also exposed to soiling and changing levels of moisture as a result of frequent use, and therefore adequate corrosion resistance is required. To achieve high strength and outstanding corrosion resistance, in some modern commercial aircraft, for example seat rails or rails for receiving cabin monuments are already made of titanium in some portions. It is known for such rails to be made completely of titanium in regions that are susceptible to corrosion, but this is very expensive.

A combination of portions made of titanium and portions made of another material could be advantageous in terms of weight and cost. DE 10 2015 100 189 A1 discloses for example producing a first profile from aluminium and a second profile from titanium and interconnecting said profiles. For this purpose, a recess is provided in the first profile, in which the second profile is inserted in an interlocking manner and bonded.

BRIEF SUMMARY OF THE INVENTION

The problem addressed by an aspect of the invention is therefore that of proposing an alternative hybrid support rail which has adequate corrosion resistance, is simple to mount and to maintain, and can be used in a flexible manner.

A hybrid support rail for receiving fixtures in a cabin of a vehicle is proposed, comprising a support rail base, a plurality of first attachment elements, a plurality of second attachment elements which are formed so as to be complementary to the first attachment elements, and a support rail upper part, wherein the support rail base has a lower side and an upper side, wherein the upper side has a receiving housing extending along a main extension direction of the support rail base for sliding in first attachment elements and, on a side facing away from the lower side, has a support surface which has at least one recess, wherein the receiving housing is formed so as to prevent the first attachment elements from sliding out towards the support surface, wherein the support rail upper part has a contact surface for placement on the support surface, and wherein the contact surface has a plurality of openings through which the second attachment elements are guided for insertion in the first attachment elements.

The hybrid support rail therefore consists of a support rail base and a support rail upper part which can be connected to the support rail base to create the support rail. The support rail base can be connected to a vehicle structure and in particular to a floor structure and is therefore used as a base for receiving the support rail upper part. It is conceivable for only the support rail upper part to project into the cabin or to be visible from the cabin, whereas the support rail base could be substantially hidden.

The first attachment elements are formed so as to be complementary to the second attachment elements and are used to attach the support rail upper part to the support rail base. According to an embodiment of the invention, the support rail base is designed in such a way that the first attachment elements are held in the support rail base by the shape thereof.

For this purpose, the support rail base comprises the receiving housing which, on the upper side thereof, has a support surface for receiving the contact surface of the support rail upper part. The support surface can be a planar surface which is designed to come into planar contact with an equally planar contact surface of the support rail upper part. No complexly shaped surfaces are required to allow a desired orientation or guidance of the support rail upper part on the support rail base. Instead, by sliding in the first attachment elements, a plurality of attachment points can be provided which are guided through the shape of the receiving housing and, by means of the complementarily formed second attachment elements, produce interlocking contact with the support rail upper part. The support rail upper part could then be completely planar at least in the region of the contact surface. The receiving housing is designed to guide the first attachment elements in a movable manner exclusively along the main extension direction of the receiving housing. Sliding out towards the support surface is prevented. A tractive force, which runs on the first attachment elements towards the support surface, is thus transmitted into the support rail base. For this purpose, the receiving housing can for example be designed in the region of the support surface in such a way that the recess has a smaller extent than the associated width of the first attachment elements.

By means of a hybrid support rail which is designed in this way, a combination of different elements for different intended purposes can be achieved. It is thus possible to retrofit different functions, adapt to new standards or comply with new regulations without having to dismantle the entire support rail. Furthermore, different materials can be used without any problems. It is possible to use a support rail upper part to provide a portion of the support rail profile which is preferably as small as possible with particularly corrosion-resistant and mechanically highly resilient properties and simultaneously design the contact surface to be as simple as possible to make production easier.

In one advantageous embodiment, the support rail upper part is formed from a first material, wherein the support rail base is formed from a second material, and wherein the first material and the second material are different from one another. As shown previously, by separating the support rail into two parts which can be placed one on top of the other, different materials can be used without any problems so that the support rail upper part, which is placed under particular strain during the operation of the vehicle, could consist of a material which is superior to that of the support rail base which is connected to the structure.

As already mentioned previously, it is particularly preferable for the support rail upper part to consist of titanium or a titanium alloy.

However, the support rail base could consist of an aluminium alloy. This could correspond in particular to alloys which are conventional in aircraft construction and could be based for example on the Al—Mg—Si alloy system.

In one advantageous embodiment, the support rail upper part comprises a planar chord having two projections facing away from the contact surface, which, together with the chord, enclose a cavity in part, wherein the projections, on a side facing away from the planar chord, comprise an upper boundary surface which is parallel to the chord and has a central slot which is permeated by holes, the diameter of which is greater than the width of the slot, and which holes are distributed in a pattern along the slot. The support rail upper part could thus correspond to what is known as the "crown" of a conventional seat rail. Mushroom-shaped bolts could be placed in the holes so that they reach the enclosed cavity. By sliding the bolts into a region between two consecutive holes, by applying tensile force which faces away from the chord and is directed outwards, a clamping force can be achieved between the bolt and the boundary surfaces pointing into the cavity. Many fixing devices for fixing passenger seats or passenger seat groups in a cabin of an aircraft are based on this principle. Therefore, it is particularly advantageous to design the support rail upper part in this way.

The receiving housing could extend along a main extension axis of the support rail base and be delimited by two parallel walls which extend at a constant distance from one another at least in some portions. Therefore, a substantially tubular receiving housing is provided, which has a rectangular and optionally square cross section. First attachment elements which have a complementarily formed cross section can be slid into said cross section. A receiving housing equipped in this way allows very easy sliding along a main extension axis but can provide shoulders for retaining the first attachment elements in the case of a tensile force directed towards the support rail upper part.

In one preferred embodiment, the recess of the support surface is a continuous slot which extends along a main extension axis of the support rail base. It is particularly simple to shape the recess as a continuous slot, and it is not necessary to align holes between the support rail upper part and the support rail base with one another or even to produce said holes together. Furthermore, any tolerances between the two components can thus be compensated. It is additionally possible to compensate for different thermal stresses in that the attachment elements along the main extension direction could carry out a compensation movement in the case of different thermal expansions. The slot additionally allows the simple sliding of the first attachment elements in that, by means of a rod, a screwdriver or a similar instrument, the first attachment elements are slid along the extent of the rail by the relevant instrument.

The width of the slot is preferably smaller than the distance between the parallel walls of the receiving housing. The function of the support shoulder is fulfilled by the smaller width of the slot.

Particularly preferably, the receiving housing is arranged on a web and closed with respect to the web. The web could correspond to a web of a double-T profile or of a similar profile body and allows high loads to be received in the extension plane thereof. Depending on the design of the support rail according to an embodiment of the invention, the installation conditions and the loads to be expected, the geometrical moment of inertia of the web can be adapted accordingly. The receiving housing can be formed integrally with the web, for example by means of an extrusion process. However, it is also conceivable for the receiving housing to be connected to the web by a material-uniting process, for example by welding. Particularly preferably, the receiving housing is located centrally on the web, that is to say it is mirror-symmetrical to the main extension plane of the web. By means of a root region, which adjoins the web, of the receiving housing, in which the receiving housing is completely closed with respect to the web, it is possible to prevent the first attachment elements from tilting or jamming while being pushed through.

In one advantageous embodiment of the support rail, the support rail base has a base flange extending parallel to the support surface. The base flange could be a chord which is oriented perpendicularly to the web. The base flange could have a width which corresponds to a width of the support rail upper part. However, a smaller or greater width can also be provided depending on the load scenario.

Particularly preferably, the width of the base flange is greater than the width of the support surface.

The first attachment element can be a body which is formed so as to be complementary to the receiving housing, comprising a threaded hole which is open with respect to the recess of the support surface. The threaded hole then extends towards the support rail upper part. The support rail upper part can be attached using screws having an outer thread. The openings of the contact surface can be designed in such a way that the screws do not have a large amount of free play in the movement thereof along the extension plane of the contact surface. As a result, a particularly good orientation of the support rail upper part can be achieved. During the attachment, it is possible to initially tighten the screw connections only finger tight, in order to completely tighten all the screw connections once the entire support rail upper part is oriented correctly. Screw-induced stresses can thus be avoided. Furthermore, low tolerances which are produced during the production of the support rail upper part or the support rail base can thus be compensated.

The first attachment element can be a cylindrical, cube-shaped or cuboid body, wherein the threaded hole extends centrally through the body. In particular, a cylindrical body which has a completely round lateral surface is possible. It is thus possible to almost entirely prevent jamming between the lateral surface and the walls of the receiving housing. However, the body could also have a cuboid shape having an extent which is considerably greater along the main extension direction of the receiving housing than the width of the receiving housing. Elongate bodies are thus produced which have for example a centrally arranged threaded hole and can also be slid through the receiving housing very easily.

Preferably, the second attachment element is a screw having an outer thread. In particular, it is possible to use screws having a countersunk head in order to allow any attachment means for attaching fixtures to slide in the support rail upper part as required.

Lastly, the invention relates to an aircraft, comprising a cabin having at least one support rail according to the previous description, wherein the support rail is in the form of a fastening rail, a seat rail or a sliding rail.

BRIEF DESCRIPTION OF THE DRAWINGS

Further features, advantages and possible applications of the present invention can be found in the following description of the exemplary embodiments and the drawings. In this case, all the features described and/or depicted, individually or in any desired combination, also form the subject matter of the invention regardless of the composition thereof in the individual claims or the dependency references thereof. Furthermore, in the drawings, like reference signs represent like or similar objects.

DETAILED DESCRIPTION

Figure 1:
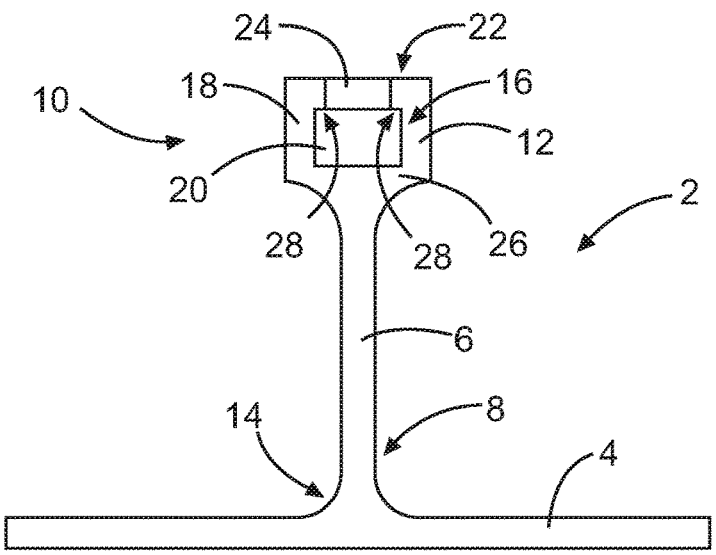
FIG. 1 is a sectional view of a support rail base.

FIG. 1 shows a support rail base 2 which comprises a base flange 4 extending horizontally in the drawing plane, a web 6 which is arranged centrally thereon and has a lower side 8, an upper side 10 and a receiving housing 12 arranged on the upper side 10. The base flange 4 and the web 6 are joined by way of example in a material-uniting manner and have a harmonically rounded-off transition region 14.

The receiving housing 12 has for example two walls 16 and 18 extending parallel to one another and at a distance from one another which enclose a receiving cavity 20. Said cavity has for example a rectangular cross section having constant dimensions and is delimited at the top, that is to say on a side facing away from the base flange 4, by a support surface 22. In said support surface, a recess 24 in the form of a slot is provided. The slot 24 extends centrally directly over the web 6. The receiving housing 12 further has a root region 26 in which the receiving cavity 20 is completely closed with respect to the web 6. The receiving housing 12 is designed to receive first attachment elements (not shown here) and to guide said elements in a slidable manner into the receiving cavity 20 until said elements connect to second attachment elements (not shown). By means of shoulders 28, said elements are prevented from being released from the receiving cavity 20 towards the support surface 22.

Figure 2:
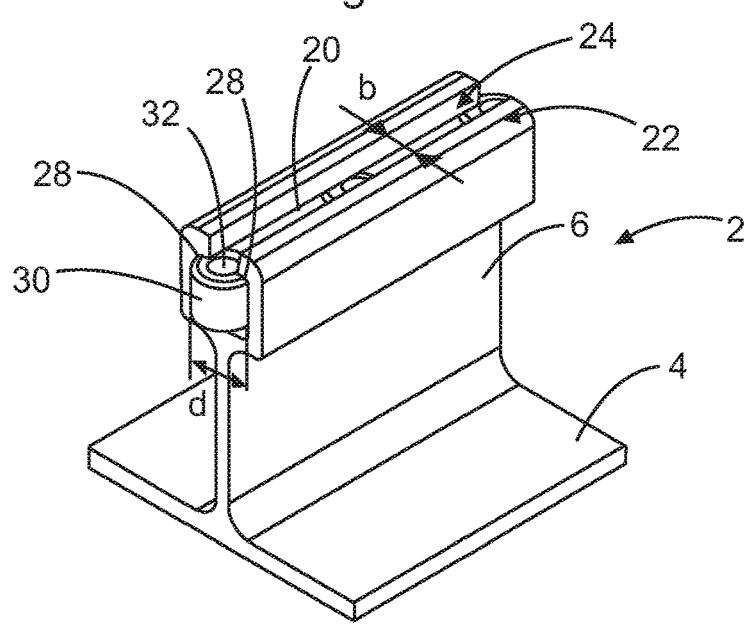
FIG. 2 is a perspective view of a support rail base.

FIG. 2 is a perspective view of the support rail base 2. In this case, first attachment elements 30 are slid into the receiving housing 12 so that said attachment elements are located in the receiving cavity 20. Said elements are cylindrical and have a threaded hole 32. The diameter d thereof is greater than a width b of the slot 24. This results in the shape of the shoulders 28 which means that the first attachment elements 30 cannot be released from the receiving cavity 20 towards the support surface 22. However, each of the first attachment elements 30 can be reached through the slot 24.

Figure 3:
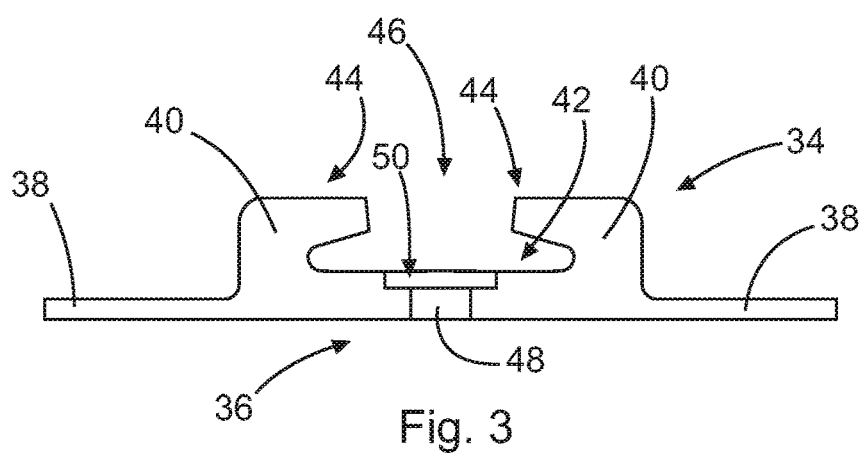
FIG. 3 is a sectional view of a support rail upper part.

FIG. 3 shows a support rail upper part 34, which can be placed on the support surface 22. For this purpose, the support rail upper part 34 has a contact surface 36 which can be brought into planar contact with the support surface 22. The entire side of the support rail upper part 34 comprising the contact surface 36 is planar. The support rail upper part 34 is formed substantially by a planar chord 38 which can be seen in the form of two upper flanges.

On the side of the support rail upper part 34 facing away from the contact surface 36, two projections 40 are provided which, together with the chord, enclose a cavity 42 in part. The projections 40 have an upper boundary surface 44 which encloses a central slot 46, which in turn is permeated by a plurality of holes (not shown) distributed along a pattern. A seat rail profiled part is thus provided, which allows mushroom-shaped bolt elements to be inserted and locked.

To attach the support rail upper part 34, a plurality of openings 48 are provided which are in the form of through holes having a countersinking 50 facing away from the contact surface 36. In this case, screw means can be in the form of second attachment elements and screwed together with the first attachment elements 30 by means of the threaded hole 32 located therein.

Figure 4:
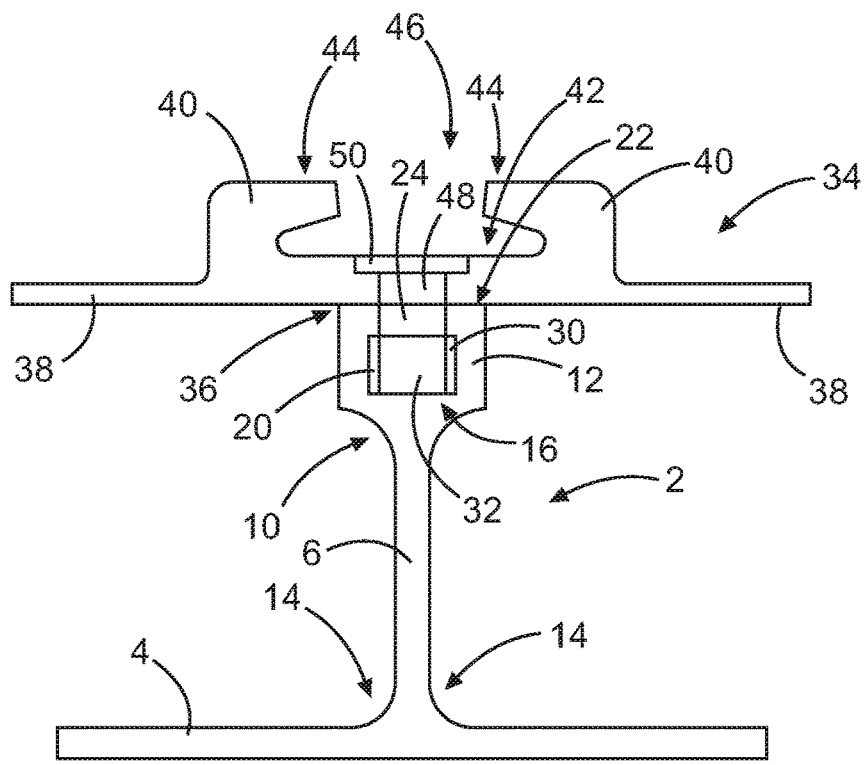
FIG. 4 is a sectional view of a support rail base having a support rail upper part arranged thereon and first attachment elements.

A resulting arrangement is shown in FIG. 4. In this case, the support rail upper part 34 comprising the contact surface 36 is arranged on the support surface 22 of the support rail base 2. The first attachment means 30 are slid into the receiving housing 12 so that the threaded holes 32 are located underneath the slot 24.

Figure 5:
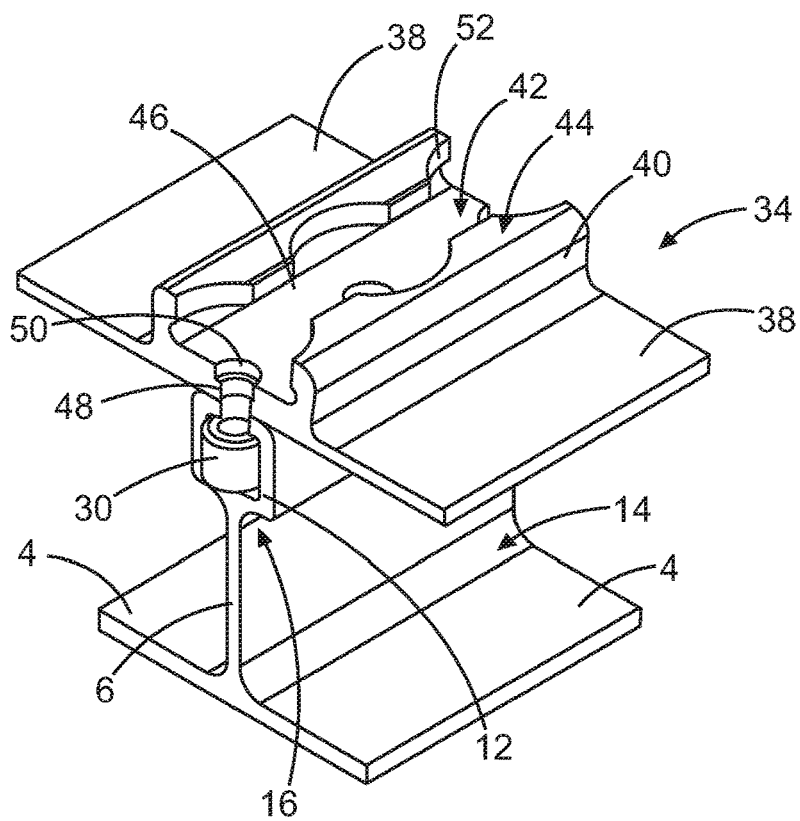
FIG. 5 is a perspective view of a support rail base having a support rail upper part arranged thereon and first attachment elements.

This is shown in FIG. 5 in a perspective, partially cut-out view. The above-mentioned holes 52 which permeate the slot 46 are also illustrated here. The first attachment elements 30 can be slid inside the receiving housing 12 as desired. By way of example, said elements are shown here in alignment with the openings 48 of the support rail upper part 34. The first attachment elements 30 can of course be slid through the slot 24 by means of a suitable tool or instrument.

Figure 6:
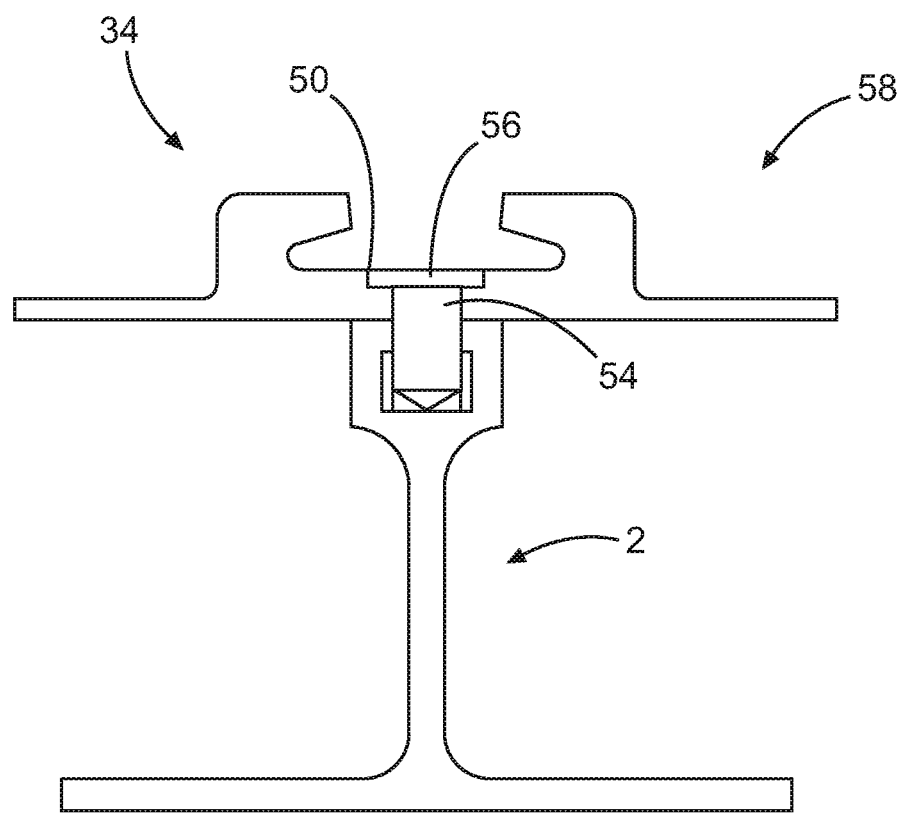
FIG. 6 is a sectional view of a support rail.

FIG. 6 now shows the arrangement from FIG. 4 with additional second attachment elements 54 in the form of screws or bolts which have a screw head 56 which can be screwed completely into the countersinking 50. This thus produces a support rail 58.

As shown in the previous description, the support rail upper part 34 can be produced from a different material, for example titanium or a titanium alloy, to the support rail base 2. Said support rail base could consist of an aluminium alloy. The shape of the support rail upper part 34 is particularly simple, since the basic shape could be produced by means of extrusion in order to subsequently carry out material-removing secondary machining processes. The support rail upper part 34 can have considerably better corrosion resistance than the support rail base 2. This is particularly expedient for the use as a seat rail, in which the support rail upper part 34 projects into the passenger cabin of an aircraft, whereas the support rail base 2 disappears into or under a floor plate.

Figure 7:
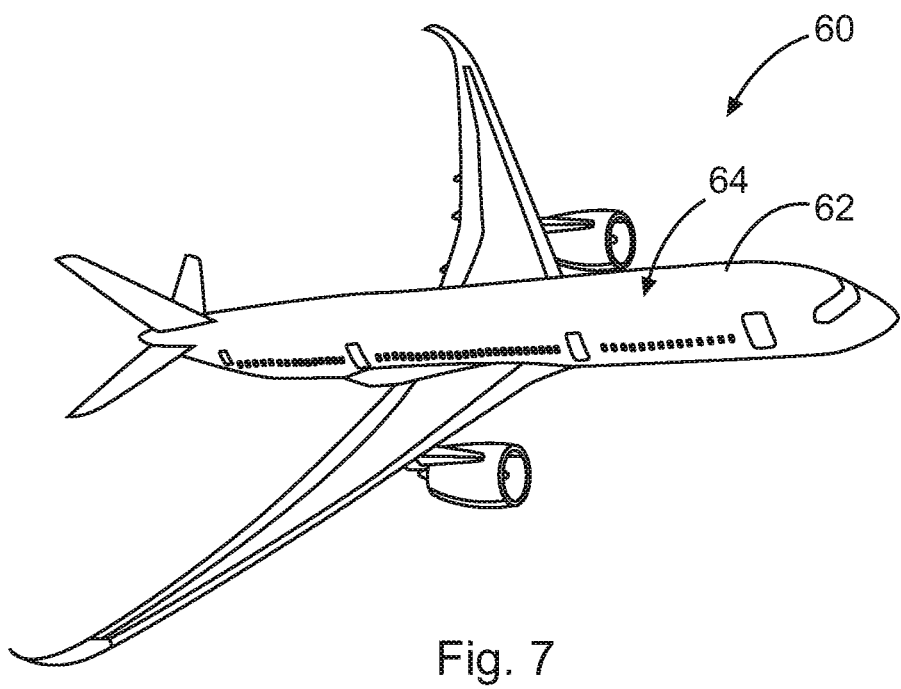
FIG. 7 shows an aircraft.

Lastly, FIG. 7 shows an aircraft 60 comprising a fuselage 62, in the interior of which a passenger cabin 64 is formed. In this case, hybrid support rails 58 are used, as illustrated in the previous drawings.

In addition, it should be noted that "comprising" does not rule out any other elements or steps, and "a" or "an" does not rule out a plurality. Furthermore, it should be noted that features which have been described with reference to one of the above exemplary embodiments can also be used in combination with other features of other exemplary embodiments described above. Reference signs in the claims are not to be considered a restriction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 2 support rail base
4 base flange
6 web
8 lower side
10 upper side
12 receiving housing
14 transition region
16 wall
18 wall
20 receiving cavity
22 support surface
24 recess/slot
26 root region
28 shoulder
30 first attachment element
32 threaded hole
34 support rail upper part
36 contact surface
38 chord
40 projection
42 cavity
44 upper boundary surface
46 slot
48 opening
50 countersinking
52 hole
54 second attachment element
56 screw head
58 support rail
60 aircraft
62 fuselage
64 passenger cabin
b width of slot 24
d diameter of first attachment element 30

The invention claimed is:

1. A hybrid support rail for receiving fixtures in a cabin of a vehicle, comprising:
a support rail base made of a first material;
a plurality of first attachment elements;
a plurality of second attachment elements formed so as to be complementary to the first attachment elements; and
a support rail upper part made of a second material,
wherein the first material and the second material are different from one another,
wherein the support rail base has a lower side and an upper side,
wherein the upper side has a receiving housing extending along a main extension direction of the support rail base for sliding in first attachment elements and, on a side facing away from the lower side, has a support surface having at least one recess,
wherein the receiving housing is configured to prevent the first attachment elements from sliding out towards the support surface,
wherein the support rail upper part has a contact surface for placement on the support surface, and a planar chord having first and second projections on a side facing away from the contact surface,
wherein the first and second projections comprise an upper boundary surface parallel to the chord and having a central slot, wherein a plurality of openings in the central slot are defined in the upper boundary surface of the first and second projections, wherein the diameter of each opening is greater than the width of the slot, and wherein the openings are distributed in a pattern along the slot, and
wherein the contact surface has a plurality of through-holes through which the second attachment elements are configured to be guided for insertion in the first attachment elements,
wherein the contact surface has a plurality of through-holes through which the second attachment elements are configured to be guided for insertion in the first attachment elements.

2. The support rail according to either claim 1, wherein the support rail upper part includes titanium or a titanium alloy.

3. The support rail according to claim 1, wherein the support rail base includes an aluminium alloy.

4. The support rail according to claim 1,
wherein the first and second projections facing away from the contact surface which, together with the planar chord, enclose a cavity in part.

5. The support rail according to claim 1, wherein the receiving housing extends along a main extension axis of the support rail base and is delimited by two parallel walls extending at a constant distance from one another at least in some portions.

6. The support rail according to claim 1, wherein the recess of the support surface is a continuous slot extending along a main extension axis of the support rail base.

7. The support rail according to claim 6, wherein the width of the continuous slot is smaller than the distance between the parallel walls of the receiving housing.

8. The support rail according to claim 1, wherein the receiving housing is arranged on a web and is closed with respect to the web.

9. The support rail according to claim 8, wherein the support rail base has a base flange extending parallel to the support surface.

10. The support rail according to claim 9, wherein the width of the base flange is greater than the width of the support surface.

11. The support rail according to claim 1, wherein the first attachment has a body formed so as to be complementary to the receiving housing, comprising a threaded hole open with respect to the recess of the support surface.

12. The support rail according to claim 11, wherein the first attachment element is a cylindrical, cube-shaped or cuboid body, and the threaded hole extends centrally through the body.

13. The support rail according to claim 1, wherein the second attachment element is a screw having an outer thread.

14. An aircraft, comprising a passenger cabin having at least one support rail according to claim 1, wherein the support rail is in the form of a fastening rail, a seat rail or a sliding rail.

* * * * *